UNITED STATES PATENT OFFICE.

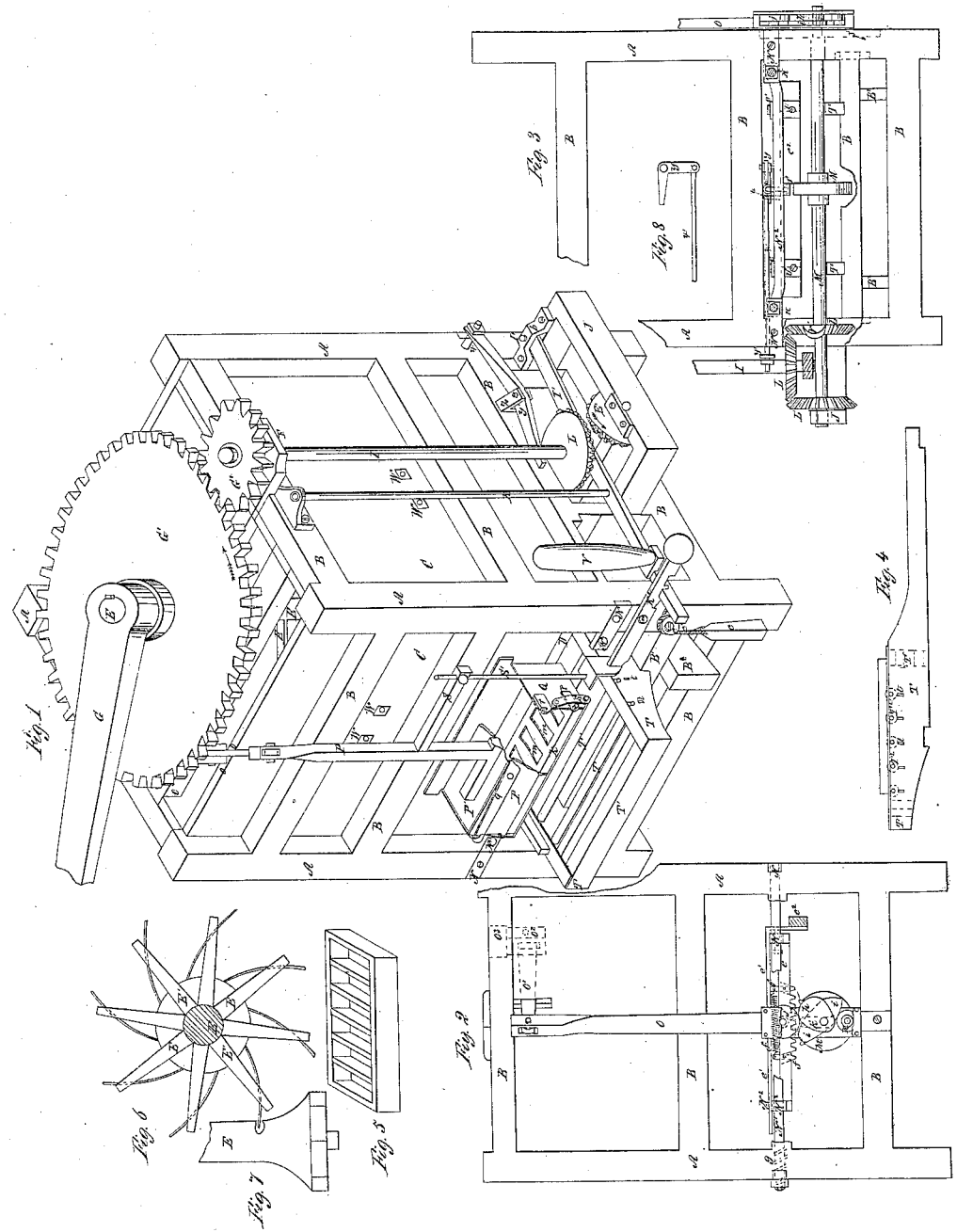
Dane, Healy & Cumings,
Brick Machine,
N° 8,271.
Patented Aug. 5, 1851.

JAMES DANE, D. HEALY, AND G. CUMINGS, OF DERBY, VERMONT, ASSIGNORS TO ISAAC DANE AND FRANCIS DANE.

BRICK-MACHINE.

Specification of Letters Patent No. 8,271, dated August 5, 1851.

*To all whom it may concern:*

Be it known that we, JAMES DANE, DARIUS HEALY, and GARY CUMINGS, all of Derby, in the county of Orleans and State of Vermont, have invented a new and useful Machine for Molding Brick From Tempered Clay by Water, Steam, or other Power; and we do hereby declare that the following is a full description of the construction and operation of the same, reference being had to the accompanying drawings making a part of this specification.

Figure 1, is an isometrical view of the front, and right sides, and the top. Fig. 2, is an elevation showing the left hand side; Fig. 3, an elevation of the back side; Fig. 4 is the frame containing the rollers, over which the molds pass; Fig. 5 a series of molds made in the usual manner, to be used in operating the machine; Fig. 6 the vertical shaft with the knives and wipers; Fig. 7 section of the vertical shaft.

Similar marks of reference, refer to like parts in all the drawings.

The frame consists of four posts A A A A, into which the girts B B, &c., are framed, and to which the planking C C of the sides and D of the bottom is fastened, that forms the tub, in which the clay is ground in the usual manner, by the knives E', projecting from the vertical shaft E which has its upper bearing between the crossbars F; the lower end turns in a hole or step at the bottom of the tub. This shaft may be turned by a horse or other animal attached to the lever G, by some convenient mode; or by any other power applied by means of a wheel gearing into the wheel G'; or a large pulley may be put upon the shaft E and driven by a belt. The wheel G' drives the wheel $G^2$ upon the shaft I which is supported by the crossbars F, and the lever I', which has its fulcrum upon the pin $I^2$ passing through the cap $b$ and the end of the lever into the frame J. The opposite end of the lever I' is supported by the rod K. The weight $c$ is attached to the lever I' by the cord $c'$ which passes over the wheel $c^2$ which turns upon a pin in the post A, and draws the lever I' toward the frame, when the outer end of the lever $K^2$ is raised (as will be hereafter described), and pulls the wheel L from the wheel L', into gear with the wheel $L^2$ and reverses the motion of the shaft N, which turns in the frame J and in the bar J' fastened to the girts B B; the handle V is fastened to the lever I to take hold of to put the molding apparatus into operation.

The slides N N, &c., fastened to each of the posts, support the rods N' N' upon which the carriage $N^2$ traverses, and has a rack, upon the under side of the bar $e$, which is acted upon by the wheel M' upon the shaft M and operates the carriage.

The teeth $f\ f$ at each extreme of the rack, vibrate in the mortises through the bar $e$, (shown by the dotted lines) upon pins passing through the bar $e$ and through the shanks of the teeth; these teeth $f\ f$ are held in a position to be acted upon by the wheel M'; by the spiral spring $f'$ which is fastened to the upper end of the shank of each tooth; so that when the wheel M' has moved the carriage either way, as far as it is necessary; the vibrating tooth which is in contact with the wheel M' yields and the carriage stops, until the wheel M' is turned in the opposite direction; when the tooth resumes its proper position, by the action of the spring $f'$; and is acted upon by the wheel M' and moves the carriage so as to bring the permanent teeth of the rack into gear. Fastened to the carriage $N^2$ are two slides $e'\ e'\ e$, the ends of which are bent at right angles and fastened to the bar $e^2$ which comes in contact with the empty molds and pushes them under the holes $m\ m$ to be filled.

The spiral springs $g\ g$ upon the rods N' N' stop the carriage $N^2$ as soon as the permanent teeth of the rack under the bar $e$ passes beyond the action of the wheel M' and prevents the carriage from being carried so far that the tooth $f$ would not take effect, when the motion of the wheel M' is reversed.

Upon the left hand end of the shaft M there are two cams, $h$ and $i$, which act upon the rollers $j$ and $k$, in the traversing bar O; the face plate of this bar, that covers the cams and rollers, and in which the pivots of the latter turn (is represented as broken off in Fig. 2, so as to show the rollers and cams) it has a slot in it similar to the slot $k'$ in the back plate represented by dotted lines; which allows it to traverse when it is acted upon by the cams $h$ and $i$ upon the shaft M; and vibrate the lever $o'$ (upon the pin in the stand $O^2$ fastened to the cross bar $O^3$), and operates the traverse rod P, which is fastened to the presser P′ in the box Q; which presser descends by the action of the cam $h$, and forces the clay in the box Q through the holes $m\ m$, and fills the molds. The box Q is fastened to the front of the tub, and the presser P′ and front or door of the box is represented as broken off to show the holes $m\ m$, and the aperture $n$, through which the clay is forced by the lower knives and wipers, projecting from the shaft E. The front or door P² of the box Q turns down upon the pivots in the slides $p\ p;$ so that it may be easily opened to remove any materials that may get into the clay. When this door is closed it is fastened by the swinging bar $q$, which latches into the catches $r\ r$.

At the bottom of the box Q there is a bar R next to the front side which strikes or planes the clay in the molds; as they are forced out. This bar is hung by the sweeps $s\ s$ fastened to the ends of the box; and is forced out by any stone, stick or other obstruction that may be in the clay, and thus save the apparatus from being broken. The presser P′ has a stand S fastened to it in which the rod S′ is fastened that forces down the lever K², (when the presser descends and fills the molds); which vibrates upon a pin in the post A, and raises the outer end and allows the lever I′ to be drawn toward the frame by the cord $c′$ and weight $c$ to change the wheel L from the wheel L′ to the wheel L².

The frame represented in Fig. 4, made of two parallel bars T T and two girts T′ T′; the bars are supported by the movable girts B′ B′ which are held up by the wedges B² B² and the tenons of the same move up or down in mortises in the posts so as to adjust the frame to a proper height. The narrow ends of the bars pass under the shaft M and rest in scores in the girt B′. There are several rollers T² T² the pivots of which turn in the bars T T in which the scrapers $t\ t$ are also fastened in such a position as to scrape the clay off of the rollers, as they are turned by the molds passing over them. The molds Fig. 5 may be put in from either side onto the rollers T²; and pushed forward as they are put in until the end of the set of molds stops against one of the projections U′ U′; upon the bar $c^2$ represented by dotted lines; when they are pushed under the holes $m\ m$, by the bar $e^2$ of the carriage to be filled. The handle V fastened the the lever I′ is seized by the operator to pull out the lever I′; and set the molding apparatus at work, the operation of which will be hereafter described. When the wheel M runs the carriage back, the circular projection Y′ on the wheel L² forces the wheel L out with the lever I′ which is caught in the second notch of the lever K²; so that the wheel L turns freely between the wheels L′ and L²; and the molding apparatus stops. On the pin $x$ in the carriage N² as it is run back, may be made to strike the bent lever $y$, fastened to the girt B and operate the rod $x′$ and lever $y′$; which vibrates in the stand $z$ fastened to the girts B, and forces the shaft I and wheel L from the wheel L²; and allows the shaft M to stop; while the apparatus for grinding the clay continues to operate. There are four rods across the tub that strengthen it, and prevent the clay from being carried around in a body by the knives, which pass above, between and below the rods; the ends of the rods with the nuts upon them are represented at $w\ w$. The bent lever $y$ and a section of the rod $x′$ are represented in Fig. 8.

To set the machine at work, put a set of molds under the holes $m\ m$, and turn the shaft E; then supply the tub with clay properly moistened; when it is ground sufficiently, push a set of molds in onto the rollers T² T² until the end of the molds come to one of the projections U′; then pull out the lever I′ by the handle V; so that the lever K² will catch the lever I′ in the outer notch; and hold the wheel L in gear with L′; and turn the shaft M, in the direction indicated by the arrow; so that the wheel M′ will move the carriage forward, and push the empty molds under the holes $m\ m;$ when the cam $h$ will act upon the roller $j$, and force down the presser P′ by the traverse rods O and P, and the lever O′ and force the clay through the holes $m\ m$ and fill the molds; when the rod S forces down the lever K², and the weight $c$ draws the lever I′ to the post; and releases the wheel L from L′ and puts it into gear with L², which reverses the motion of the shaft M, so that the wheel M′ takes the carriage back; (and the cam $i$ acts upon the roller $k$ and pulls down the rod O raising the presser P′ by the rod P and lever O′; so that the clay may be forced into the box Q through the aperture $n$, by the knives and wipers of the shaft E, to supply the place of that which was forced into the molds). When the wheel M has moved the carriage back, the circular projection $v$, forces the wheel L, with the lever I′ out; so that the lever is caught in the second notch of the lever K²; and the molding apparatus stops; or the pin $x$ may be made to act upon the bent lever $y$ and operate the rod $x′$ and lever $y′$ and carry the shaft I with the wheel L from the wheel L² and let the molding apparatus stop; while the full mold is borne off, which was pushed out by the empty one when it is shoved under the holes $m\ m$, by the carriage. The empty mold is shoved in onto the rollers as heretofore directed; when the lever I′ may be pulled out again, and the molding proceeds as heretofore described.

What we claim as our invention and desire to secure by Letters Patent is—

1. The arrangement of mechanism substantially as herein described viz, the toothed wheel M and the cams $h$ and $i$ operated by the changing gear on the equivalent thereof connected with the mill so as to be moved alternately back and forth for the purpose of operating the mold carriage and the pressing piston P substantially in the manner herein set forth.

2. We also claim the adjustable rod S or its equivalent connected with the piston rod P, for the purpose of acting upon the clutch lever $K^2$ or its equivalent so as to disengage the weight $c$, or its equivalent by which the operating machinery is thrown out of gear for the purpose of arresting the pressing motion as soon as the piston has been depressed far enough to fill the molds.

3. Is the circular projection V' or its equivalent upon the wheel L to throw the wheel L out of gear and stop the molding apparatus while the grinding proceeds.

In testimony whereof, we have hereunto signed our names before competent witnesses.

JAMES DANE.
DARIUS HEALY.
GARY CUMINGS.

Witnesses:
WILLIAM MOON, Jr.,
FRANKLIN CAREY,
ASHLEY GOULD.